(12) United States Patent
Fedorenko et al.

(10) Patent No.: US 7,828,470 B2
(45) Date of Patent: Nov. 9, 2010

(54) ELECTRONIC INDICATOR WITH BACKLIGHTING

(75) Inventors: Maria Fedorenko, Aurora (CA); Gary Warren, Aurora (CA)

(73) Assignee: Flextronics Automotive Inc., Scarborough, Ontario (CA)

( * ) Notice: Subject to any disclaimer, the term of this patent is extended or adjusted under 35 U.S.C. 154(b) by 693 days.

(21) Appl. No.: 11/039,930

(22) Filed: Jan. 24, 2005

(65) Prior Publication Data

US 2006/0164849 A1 Jul. 27, 2006

(51) Int. Cl.
*B60Q 3/04* (2006.01)
*F21V 9/16* (2006.01)
*G09F 9/30* (2006.01)

(52) U.S. Cl. .................. 362/491; 362/30; 362/231; 40/444; 40/556

(58) Field of Classification Search .......... 362/23, 362/27, 29, 30, 489, 491, 231, 812; 340/456; 116/28.1; 40/556, 444, 542, 543, 544, 546
See application file for complete search history.

(56) References Cited

U.S. PATENT DOCUMENTS

| | | | | |
|---|---|---|---|---|
| 2,953,668 A | * | 9/1960 | Bassett, Jr. .................. | 362/27 |
| 4,012,632 A | * | 3/1977 | Stone .......................... | 362/23 |
| 4,443,835 A | * | 4/1984 | Brautigam et al. ............ | 362/30 |
| 4,991,535 A | * | 2/1991 | Kobayashi et al. .......... | 116/28.1 |
| 5,099,592 A | | 3/1992 | Layne | |
| 5,159,892 A | * | 11/1992 | Hara et al. .................. | 116/28.1 |
| 5,477,430 A | * | 12/1995 | LaRose ........................ | 362/84 |
| 5,512,875 A | * | 4/1996 | Polityka ...................... | 340/456 |
| 5,537,300 A | * | 7/1996 | Kraines et al. ................ | 362/85 |
| 5,555,161 A | * | 9/1996 | Roe et al. .................... | 116/28.1 |
| 5,696,483 A | * | 12/1997 | Khalid et al. ................ | 340/456 |
| 5,973,593 A | * | 10/1999 | Botella ........................ | 340/456 |
| 6,044,790 A | * | 4/2000 | Murakami .................... | 362/491 |
| 6,158,867 A | * | 12/2000 | Parker et al. .................. | 362/29 |
| 6,367,940 B1 | * | 4/2002 | Parker et al. .................. | 362/29 |
| 6,843,010 B2 | * | 1/2005 | Robinson et al. .............. | 40/571 |
| 6,883,393 B2 | * | 4/2005 | Ishimaru ...................... | 340/456 |
| 2003/0179088 A1 | * | 9/2003 | Heller .......................... | 340/479 |
| 2004/0070964 A1 | | 4/2004 | Lo | |
| 2005/0068761 A1 | * | 3/2005 | Chien ........................... | 362/84 |

FOREIGN PATENT DOCUMENTS

JP 06117525 A * 4/1994 ............... 340/456

OTHER PUBLICATIONS

Harada et al, "Shift Lever Device", Apr. 26, 1994, Searching Patent Abstracts of Japan (PAJ), English translation, pp. 1-5+.*

* cited by examiner

*Primary Examiner*—Alan Cariaso
(74) *Attorney, Agent, or Firm*—Patton Boggs LLP

(57) ABSTRACT

In one implementation, a method provides a plurality of graphics. The method backlights the graphics by using reflected light and/or blocking direct light. The method also highlights one of the graphics by using direct light that overpowers the backlighting of the one of the graphics.

19 Claims, 3 Drawing Sheets

ELECTRONIC INDICATOR WITH BACKLIGHTING

FIELD OF THE INVENTION

An embodiment of the present invention relates to an electronic indicator with backlighting.

DESCRIPTION OF BACKGROUND INFORMATION

Traditional gear shifter indicators include graphics that are backlighted with lighting devices located directly behind the graphics and, also, include highlighting devices that cause a shadow on the graphics. Traditional gear shifter indicators, with graphics and lighting devices of different colors located directly behind the graphics, are also not cost effective and do not supply even lighting.

BRIEF DESCRIPTION OF THE DRAWINGS

In the drawings, like reference numerals represent similar parts of the illustrated embodiments of the present invention throughout the several views and wherein.

DETAILED DESCRIPTION

Figure 1:
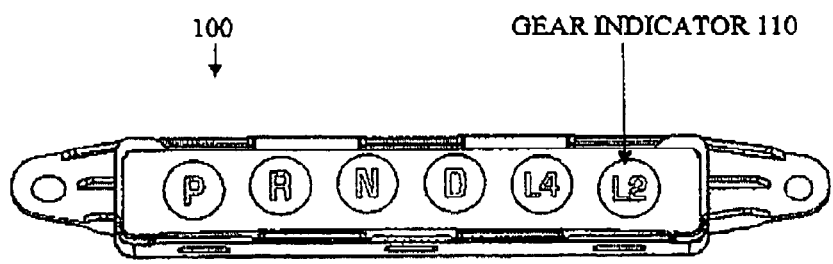
FIG. 1 depicts a front view of an embodiment of a gear shifter indicator.
Figure 2:
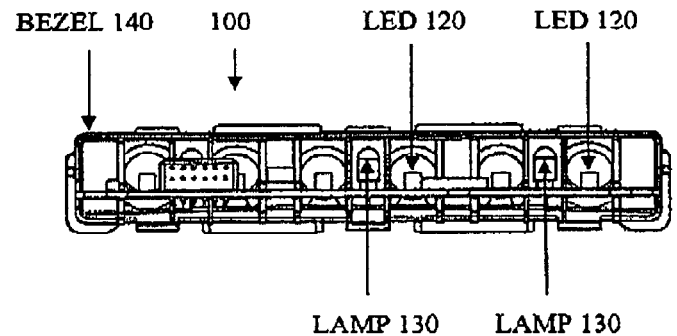
FIG. 2 depicts a back view of the gear shifter indicator of FIG. 1.
Figure 3:
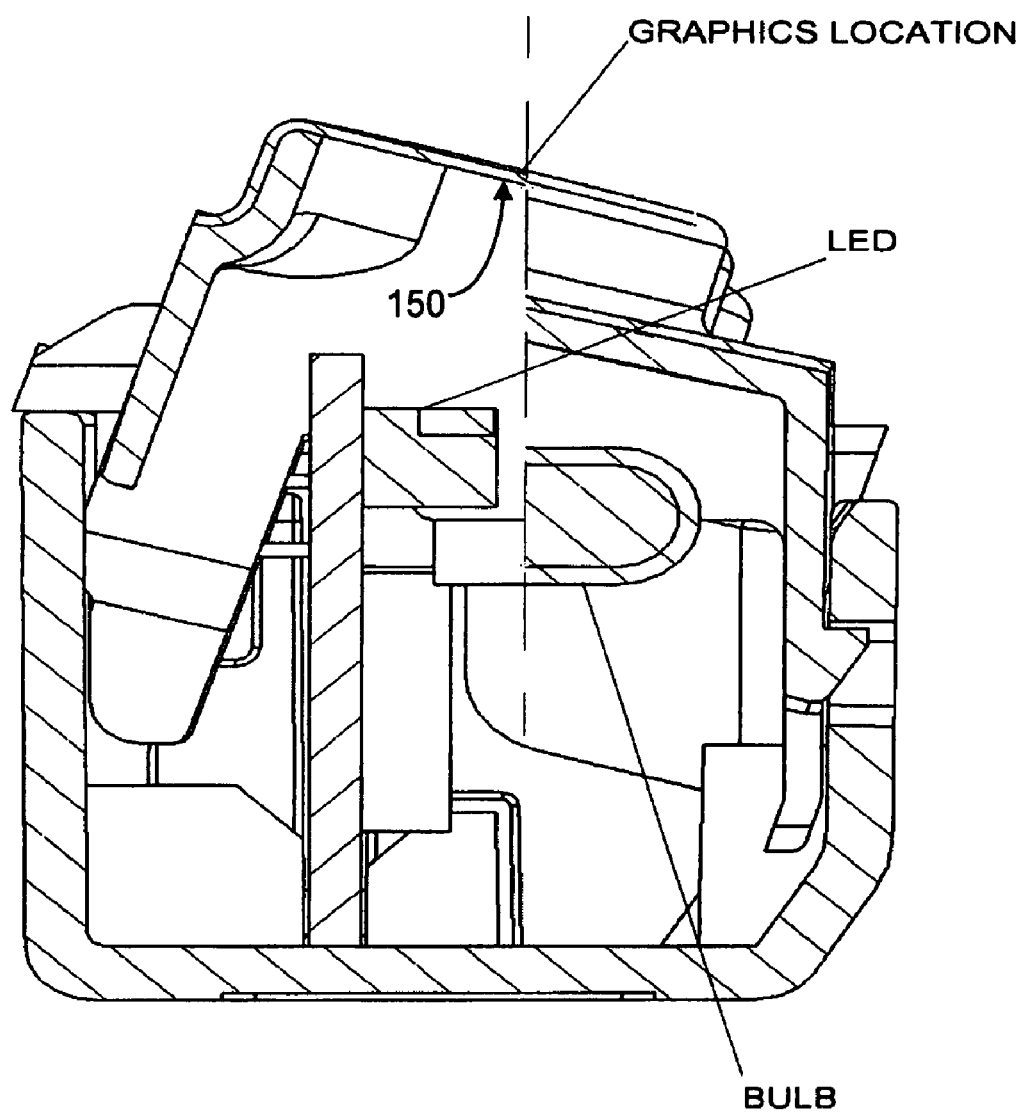
FIG. 3 depicts a cross-sectional view of the gear shifter indicator of FIG. 1.
Figure 4:
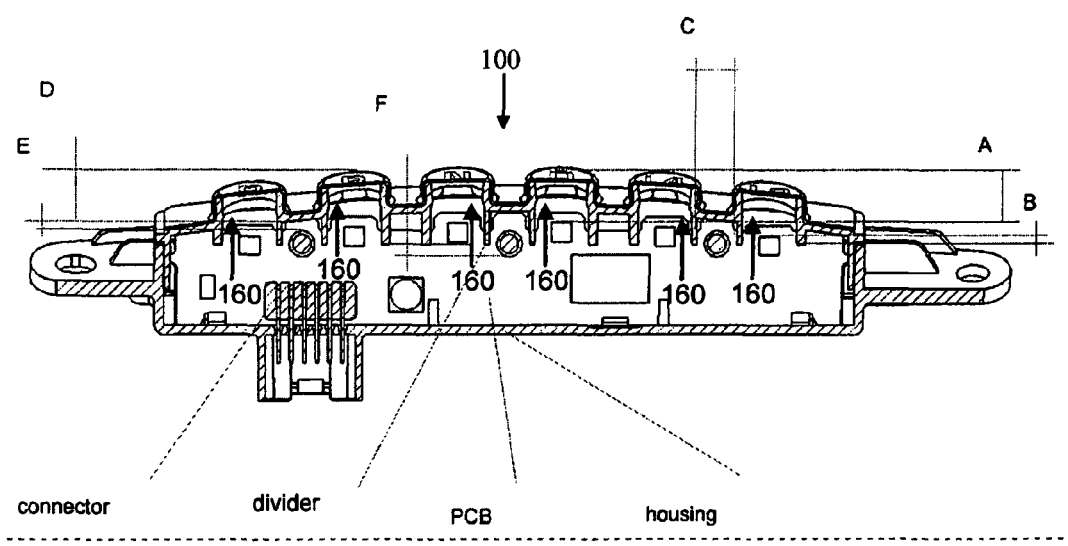
FIG. 4 depicts side view of the gear shifter indicator of FIG. 1.

One embodiment of the present invention (see e.g., FIGS. 1-4) allows an electronic gear shifter indicator 100, or any other automotive or general consumer electronic application, to provide constant backlighting in a first wave length and highlighting in a second wave length, for example, without traditional enunciators. The gear shifter indicator (e.g., without enunciators) may backlight graphic indicators 110 in a blue-white color and highlight one of the graphic indicators in amber. The one of the graphic indicators may be highlighted without light spillage to any other graphic indicators. The lighting conditions of backlighting and highlighting may not be affected by any light obstruction that causes shadows on any part of the graphics.

A graphic of the gear shifter indicator may be lit for highlighting by a LED 120 located, for example, directly behind a graphic. A transmissibility layer on the graphic may allow the gear shifter indicator to produce even highlighting.

The remaining graphics may be backlighted, for example, without any shadowing effect from the LEDs, by reflected light (as opposed to traditional direct lighting approach) to produce an even glow. A reflected light box design may block direct light within the box from reaching the graphics (see FIG. 2). All background lighting may be reflected off an opaque white housing, a white screened PCB, and/or a white connector housing (see FIG. 4).

When a graphic is highlighted, the LED behind it may be focused so that all direct light is concentrated in the graphic area (and no direct light leaks from the shielded box containing the LED). The direct light, for example, from the LED overpowers the backlighting so that only the LED light can be seen. Any reflected light from the LED may not be intense enough to reflect back and affect the background lighting of the neighboring graphics. Also, the tunnels of the gear shifter indicator 160 may be molded in the color of the backlighting, so that any stray light from the highlighting LED will not affect any backlighting of the neighboring graphics (see FIG. 2).

The gear shifter indicator may include reflective backlighting that is supplied by incandescent bulbs 130, and direct lighting that is supplied by one or more LEDs 120. The backlighting may be achieved by incandescent light and/or LED devices depending on the wave length and light intensity requirements. The direct lighting may have a different wave length than the backlighting. A plurality (e.g., 3 or more or less) bulbs may supply the reflective backlighting, where incandescent light may reflect from the white housing walls and a light blue bezel surface. One designated LED may emit the direct light to indicate the proper gear designator in a required wave length and intensity.

The color (e.g., light blue) of a bezel 140 may be used to tint any escaping light from the individual highlighting LEDs the same color as the night time background lighting (e.g., the night time background lighting may be light blue). The escaped light from these LEDs may then be more difficult to see since it may blend in with the background light. The blue tint may also reflect a large portion of the blue background light from the incandescent bulbs, thereby making the tunnel areas on the bezel glow 160 and produce even, shadowless background light at night. The prominent position of the LEDs used to highlight the individual graphics may then not block the background lighting and produce an obvious shadow on the graphics.

Correlations between variables in the lighting process include:

LEDs location within the tunnel, from light obstruction perspective (A,D);

correlation between length of the light barriers and LEDs and incandescent bulbs location (B,F);

LEDs location relative to the graphics (A,D);

proper color of the tunnels to prevent light leakage from one gear position to the other and at the same time give sufficient amount of the reflective light; and/or minimum distance between light barriers and the top portion of the bezel from the heated incandescent bulbs (E).

The gear shifter indicator may achieve: no light leakage from one gear position indicator to the other, overpowering of the bright sunlight for the day time indicators intensity, and/or no light obstruction caused by LEDs or bulbs devices.

The transmissibility of the diffusing layer 150 may allow a compromise to be reached between the brightest graphic possible and the most even lighting possible. The clearer the diffusing layer 150 is, the more light that will get through and give the brightest LED lit daytime graphic, so that the highlighted graphic is clearly visible when direct sunlight is shining on the graphic (and meet a FMVSS lighting specification). The more the light is scattered by the diffusion layer 150, the more even the graphic will appear when lit. The scattering of the diffusing layer 150 may be maximized to the point where the highlighted graphic becomes dimmer, but is still clearly visible with direct sunlight shining on it. This maximizes the evenness of the graphics lighting in all conditions (e.g., when it is highlighted by the LED, and when it is background lit at night time) and ensures that it is visible in all conditions.

The diffusing layer 150 may be made using a clear ink with white pigment suspended inside it. The more white pigment there is, the more the light is diffused, thereby reducing the overall intensity. This ink may be screened onto a frosted polycarbonate sheet.

The diffusing layer 150 may be measured by determining the reduction in the lighting intensity when light passes through the layer. First, the intensity of the light source may be measured through a frosted polycarbonate sheet placed 8 mm in front of the light source. The light intensity may then be measured through the frosted polycarbonate sheet with the diffusing layer 150 screened onto it. This may be recorded as a percentage of the original intensity measurement (through the polycarbonate sheet without the diffusing layer). A value for the diffusing layer 150 may be about 30% of the original light intensity. A measurement of the light intensity without the diffusing layer 150 may be in the range of 16500 cd/m2 and the light intensity measurement of the light passing through the diffusion layer 150 may be in the range of 5000 cd/m2.

A technique normally used to diffuse graphics is to screen or paint the graphics white. This however reduces the intensity of the light passing through the graphics considerably (e.g., 2% of the original light intensity). This technique may be unacceptable in some cases.

The foregoing presentation of the described embodiment is provided to enable any person skilled in the art to make or use the present invention. Various modifications to the embodiment are possible, and the generic principles presented herein may be applied to other embodiments as well. As such, the present invention is not intended to be limited to the embodiment shown above, and/or any particular configuration of structure but rather is to be accorded the widest scope consistent with the principles and features disclosed in any fashion herein.

What is claimed is:

1. A method comprising:
   providing a plurality of graphics;
   backlighting the plurality of graphics by using reflected light; and
   highlighting one of the plurality of graphics by using direct light that overpowers the backlighting of the one of the plurality of graphics, wherein said backlighting the plurality of graphics includes tinting any stray light from the direct light for highlighting the same color as the reflected light for backlighting so as to blend in with the backlighting of the plurality of graphics.

2. The method of claim 1, wherein the reflected light for backlighting has a different wave length than the direct light for highlighting.

3. The method of claim 1, wherein a gear shifter indicator includes the plurality of graphics.

4. The method of claim 1, wherein the reflected light is supplied by incandescent light.

5. The method of claim 1, wherein the reflected light is supplied by a plurality of LEDs.

6. The method of claim 1, wherein the direct light is supplied by a LED.

7. The method of claim 1, further comprising:
   providing even highlighting of the graphics by using a transmissibility layer on the graphics.

8. The method of claim 1, wherein substantially all background lighting is reflected.

9. The method of claim 1, wherein the reflected light produces an even glow of backlighting.

10. The method of claim 1, wherein the reflected light is produced by a reflected light box.

11. An apparatus comprising:
    a plurality of graphics;
    a plurality of LEDs located directly behind the plurality of graphics for supplying direct light to the plurality of graphics to highlight the plurality of graphics;
    a plurality of bulbs not located directly behind the plurality of graphics for supplying reflected light to the plurality of graphics to backlight the plurality of graphics, wherein the plurality of bulbs provide reflected light by reflecting off of a surface prior to lighting the graphics; and
    at least one divider separating adjoining LEDs of said plurality of LEDs, wherein said at least one divider includes tinting any stray light from the direct light for highlighting the same color as the reflected light for backlight so as to blend in with the backlight of the plurality of graphics.

12. The apparatus of claim 11, wherein the LEDs have a different wave length than the bulbs.

13. The apparatus of claim 11, wherein the apparatus is a gear shifter indicator.

14. The apparatus of claim 11, wherein the graphics include a transmissibility layer to provide even highlighting of the graphics.

15. The apparatus of claim 14, wherein the transmissibility layer is made of a clear ink with white pigment.

16. The apparatus of claim 11, further comprising a reflected light box, the reflected light box producing the reflected light.

17. The apparatus of claim 11, wherein the reflected light provides substantially all light to backlight the plurality of graphics.

18. The apparatus of claim 11, wherein the reflected light produces a backlight with an even glow.

19. An apparatus comprising:
    a plurality of graphics;
    a plurality of LEDs located directly behind the plurality of graphics for supplying direct light to the plurality of graphics to highlight the plurality of graphics;
    a bulb located in a reflected light box, supplying only reflected light to the plurality of graphics to backlight the plurality of graphics; and
    at least one divider separating adjoining LEDs of said plurality of LEDs, wherein said at least one divider includes tinting any stray light from the direct light for highlighting the same color as the reflected light for backlight so as to blend in with the backlight of the plurality of graphics.

* * * * *